Oct. 30, 1956  H. HILBER  2,768,836
TELESCOPIC FORKS FOR MOTORCYCLES OR THE LIKE
Filed March 17, 1954  2 Sheets-Sheet 1

United States Patent Office 2,768,836
Patented Oct. 30, 1956

2,768,836

TELESCOPIC FORKS FOR MOTORCYCLES OR THE LIKE

Hanns Hilber, Stuttgart, Germany, assignor to Alfred Kreidler, Stuttgart, Germany Application March 17, 1954, Serial No. 416,905

Claims priority, application Germany March 18, 1953

5 Claims. (Cl. 280—276)

The present invention concerns telescopic front forks for road vehicles steered by a single front wheel, such as motorcycles.

In telescopic front forks frequently used today on motorcycles and engine-assisted pedal cycles, the two upper tubes in which the tubes supporting the axle of the wheel resiliently slide, are connected by cross pieces to the stem tube. The handle bar is screwed to the stem tube either in the manner of the normal bicycle handle bar or it is supported by separate clamps or the like supporting members on the upper cross piece.

One object of the present invention is to make the production of such forks cheaper. Another object is to effect an increase in the stability of the forks relative to older arrangements in which the handle bar is connected to the stem tube or by separate attachment members to the cross piece.

According to the present invention the means by which the upper tubes and the upper cross piece are connected also serve for the attachment of the handle bar on such a telescopic fork, the two upper tubes of which are connected by cross pieces to the stem tube.

Since the two upper tubes are now connected also by the handle bar and the steering forces are transmitted directly to the upper tubes, the stability is improved, or expressed differently; the handle bar now forms with its section disposed between the attachment means a supporting structural member of the fork.

As means of attachment two bolts are preferably screwed into nuts secured in the top section of the two upper tubes, passing through transverse bores in the handle bar and corresponding bores in the cross piece and handle bar, cross piece and upper tubes being held together thereby. It is preferable for the top cross piece to secure the headlamp by means of supporting members disposed thereon.

Apart from permitting further reduction in costs, this construction also has a very pleasing appearance.

The invention will be described further, by way of example, with reference to the accompanying drawings, in which:

Fig. 3 is a plan, viewed in the direction of the arrow III of Fig. 1; and

Fig. 4 is a fragmentary section of the attachment means for the top sections of the upper tubes, at enlarged scale.

Figure 1:
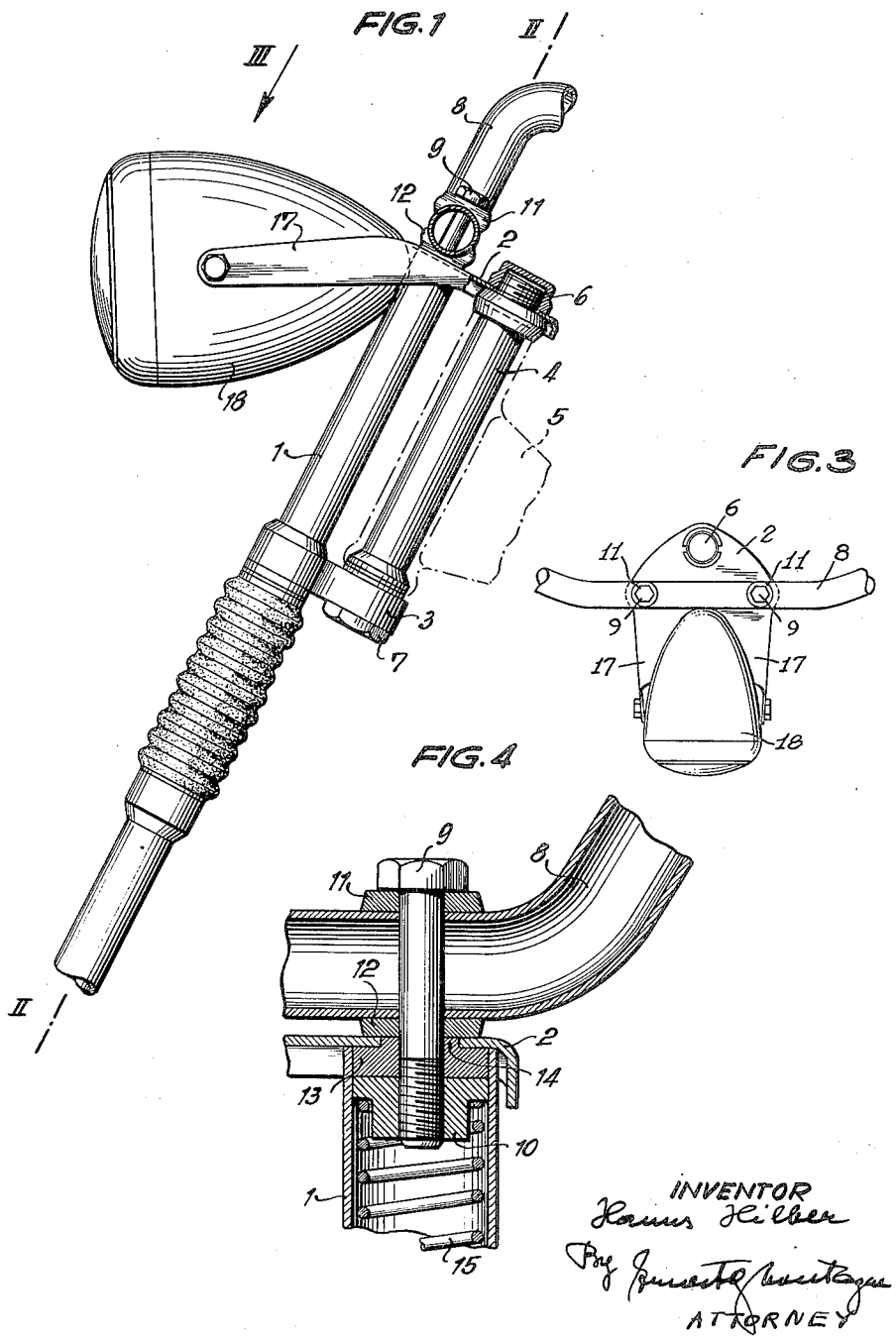
Fig. 1 is a side elevation of the upper parts of a telescopic fork constructed in accordance with the invention.
Figure 2:
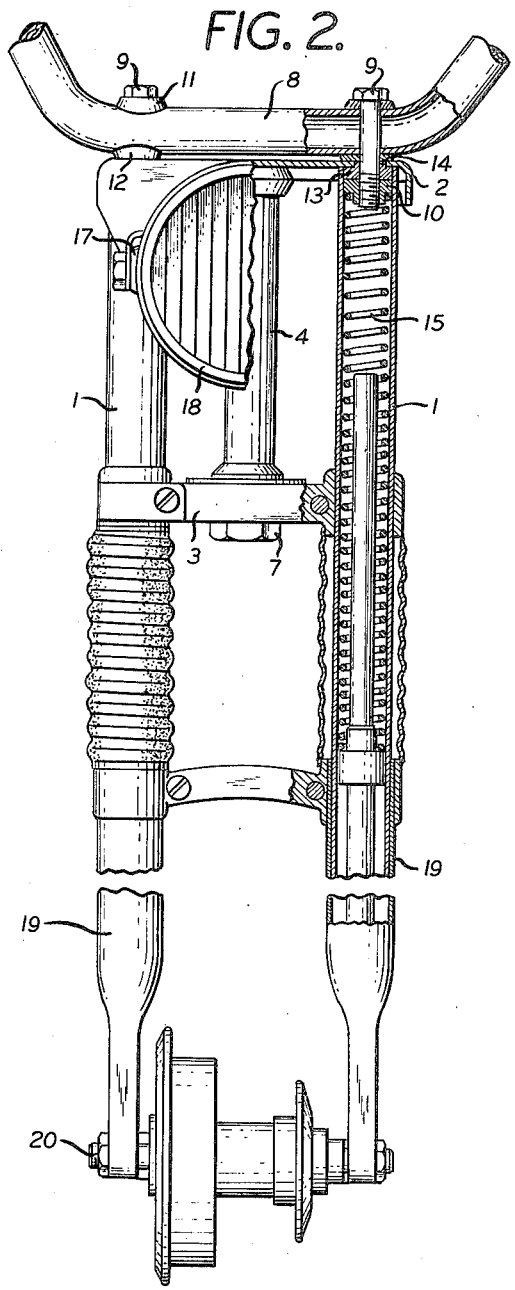
Fig. 2 is a front elevation of the fork, partially in section taken on the line II—II of Fig. 1.

The upper tubes 1 of the telescopic fork, in which the lower or sliding tubes slide in known manner and which are spring-mounted, are connected by two cross pieces 2, 3 to the stem tube 4 which is duly mounted in normal manner in the steering head 5 of the vehicle. The connection between the stem tube 4 and the cross pieces 2, 3 is effected by threaded connections 6, 7.

The handle bar 8 is bored through transversely at the required spaced interval for the two upper tubes and the two bolts 9 are passed through their bores, engaging through the cross piece 2 in nuts 10, which are secured such as by brazing or welding in the upper tubes 1 not far from the upper ends thereof. To ensure an efficient mounting washers 11 and 12, each having a partially cylindrical face radius complementarily to the external diameter of tube forming the handle bar 8, are disposed between bolt head and handle bar and between handle bar and cross piece. In order to secure the cross piece in the correct position relative to the upper tubes, intermediate members 13 are inserted therein from above, these members each having a spigot 14 which fits in the appropriate bore of the cross piece. The nuts 10 also act as a location and abutment for the upper ends of the springs 15. Finally, arms 17 which are shaped complementarily to the headlamp and tapered to a minimum width at their front ends are mounted on the upper cross piece 2. The front ends of these arms each terminates in an aperture receiving a bolt by means of which the headlamp 18 is secured.

It may be clearly seen that the handle bar section between the two bolts 9 has become a supporting component of the whole fork construction. The upper cross piece 2 is thereby relieved and the steering forces are transmitted from the handle bar immediately on to the upper tube 1 of the fork. From the drawings the clear and clean outline rendered possible by the measures proposed in the invention, may also be appreciated, and last, but not least, a considerable reduction in price of the entire fork is achieved relative to earlier forms of construction by economising in spare parts and machined surfaces.

I claim:

1. In a telescopic front fork for motorcycles and the like, a pair of lower telescopic tubes, a pair of upper tubes each presenting an open lower end portion within which the upper portion of one of the lower tubes is slidable, a stem tube having an upper end and a lower end, a lower cross piece connecting the stem tube in the region of its lower end to a mid region of said upper tubes, an upper cross piece connected to said stem tube near the upper end thereof and having two bores therein, each of said bores being substantially coaxial with one of the said upper tubes, a handle bar having two diametrical bores spaced apart by the centre distance of the upper end portion of said upper tubes, two pairs of partially cylindrically faced washers complementary to the external diameter of said handle bars, a nut fixed within the upper end portion of each of said upper tubes and two bolts, each of said bolts passing through one of said washers, said handle bar bores, another said washer, said upper cross piece and engaging in one of said nuts whereby rigidly to connect the upper end portions of said upper fork tubes.

2. A structure according to claim 1, including a lamp bracket formed integrally with said upper cross piece.

3. In a telescopic front fork for motorcycles and the like, a pair of lower telescopic tubes adapted at their lower ends to be connected to the front wheel axle, a pair of upper tubes within each of which the upper portion of one of the lower tubes is slidable, a stem tube having an upper end and a lower end, a lower cross piece connecting the stem tube in the region of its lower end to a mid region of said upper tubes, an upper cross piece connecting the stem tube in the region of its upper end to an upper end region of said upper tubes, and a handle bar and single means securing together the said handle bar and said upper cross piece to said upper tubes so as to be close thereto and to impart rigidity to the fork assembly, the said handle bar being diametrically bored at two positions spaced apart from one another at the center distances of the upper tubes, and a nut being fixed in the upper end portion of each of said upper tubes, two bolts passing through said handle bar bores and correspondingly positioned bores in said upper cross piece acting to secure the handle bar, upper cross piece and upper tubes together.

4. In a telescopic front fork for motorcycles and the like, a pair of lower telescopic tubes adapted at their lower ends to be connected to the front wheel axle, a pair of upper tubes within each of which the upper portion of one of the lower tubes is slidable, a stem tube having an upper end and a lower end, a lower cross piece connecting the stem tube in the region of its lower end to a mid region of said upper tubes, an upper cross piece connecting the stem tube in the region of its upper end to an upper end region of said upper tubes, and a handle bar and single means passing through said handle bar and securing simultaneously the said handle bar and said upper cross piece to said upper tubes so as to be close thereto and to impart rigidity to the fork assembly.

5. In a telescopic front fork for motorcycles and the like, a pair of lower telescopic tubes adapted at their lower ends to be connected to the front wheel axle, a pair of upper tubes within each of which the upper portion of one of the lower tubes is slidable, a stem tube having an upper end and a lower end, a lower cross piece connecting the stem tube in the region of its lower end to a mid region of said upper tubes, an upper cross piece connecting the stem tube in the region of its upper end to an upper end region of said upper tubes, a handle bar and means securing together the said handle bar and said upper cross piece so as to be close thereto and to impart rigidity to the fork assembly, the said means comprising two single elements each joining said handle bar with said upper cross piece and connecting both said handle bar and said upper cross piece with said corresponding upper tubes, so that said elements act to secure said handle bar, said upper cross piece and said upper tubes together.

References Cited in the file of this patent

UNITED STATES PATENTS

| | | |
|---|---|---|
| 2,511,320 | Benson | June 13, 1950 |

FOREIGN PATENTS

| | | |
|---|---|---|
| 1,028,500 | France | Feb. 25, 1953 |
| 802,551 | Germany | Feb. 15, 1951 |
| 90 | Great Britain | of 1915 |
| 636,282 | Great Britain | Apr. 26, 1950 |
| 104,632 | Sweden | May 26, 1942 |